W. B. Bartram.
Sewing Machine.
No. 2245 Reissued May 15, 1866.
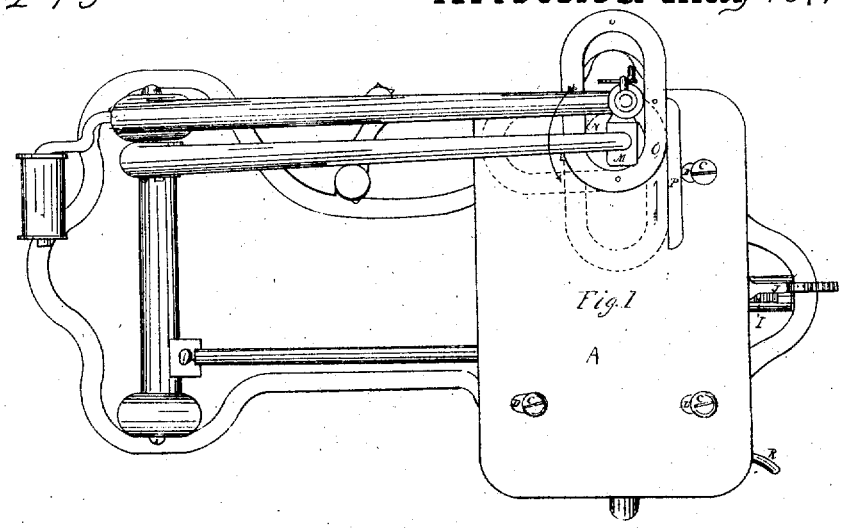
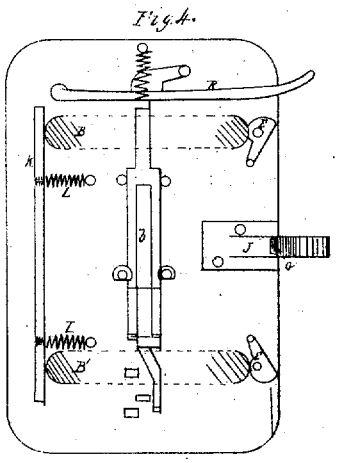
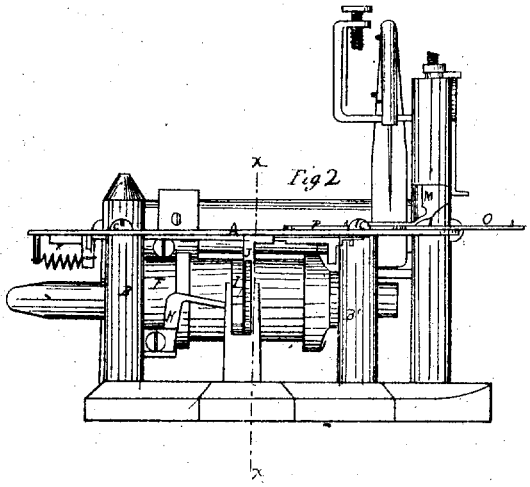
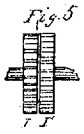
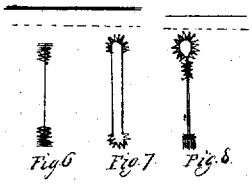
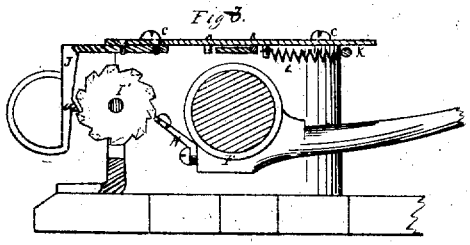
Witnesses.
Inventor
W. B. Bartram
assy not to
Bartram & Santon Mfg. Co
By R. D. Smith attorney

UNITED STATES PATENT OFFICE.

THE BARTRAM & FANTON MANUFACTURING COMPANY, OF DANBURY, CONNECTICUT, ASSIGNEES, BY MESNE ASSIGNMENTS, OF W. B. BARTRAM.

IMPROVEMENT IN SEWING-MACHINES FOR STITCHING BUTTON-HOLES.

Specification forming part of Letters Patent No. 50,870, dated November 7, 1865; Reissue No. 2,245, dated May 15, 1866.

*To all whom it may concern:*

Be it known that WALKER B. BARTRAM, of Redding, in the county of Fairfield and State of Connecticut, did invent certain Improvements in Sewing-Machines, of which the following is a full, clear, and exact description, reference being had to the accompanying drawings, in which—

Figure 1 is a plan view of my machine. Fig. 2 is an end elevation of the same. Fig. 3 is a vertical longitudinal section through the line *x x* of Fig. 2. Fig. 4 is a plan view of the under side of the sewing-table. Fig. 5 is an edge elevation of the spur-wheels which operate the table in its vibrations. Figs. 6, 7, and 8 represent different forms of button-holes. That represented in Fig. 8 is introduced for the purpose of comparison, but cannot be worked upon the machine herein described.

The invention consists, first, in working by machinery stitches across an end of a button-hole slit at right angles to its length, for the purpose of staying and strengthening said button-hole; second, in stitching by machinery button-holes having no rounded opening at the end of the slit cut in the fabric, and in perfectly finishing the same at the ends of the slit and fastening the ends of the thread without using a hand-needle; third, in devices which enable me to work button-holes with round ends; fourth, in the adaptation of devices for accomplishing these purposes.

Button-holes may be divided into two classes: first, those which have round ends, such as are commonly made in garments constructed of thick cloth, in which it is also common to enlarge one end of the button-hole in the form of an eyelet, for the better accommodation of the shank of the button; second, those which are made with square ends, and commonly strengthened and finished by stitches which pass from one side over to the other in the form of a bar across each end. These are seen in garments of linen or other thin fabrics.

That others may understand my invention, I will particularly describe those devices which are herein shown and their operation to accomplish the purposes specified.

The general construction of the machine to which my devices are represented as being attached is that of the well-known Wheeler & Wilson sewing-machine, though it is evident that that general construction of the machine is not material.

In my improved machine the cloth-plate or table A is kept in place upon the supports B B′ by screws C passing through slots D in the said plate, so as to allow the said plate to have a backward and forward movement at right angles to the line of feed, to enable the stitch to be transferred alternately from the cloth to the slit which forms the button-hole. The movement of the plate A is regulated by stops on the under side thereof acting against the supports B B′, as shown at E, Fig. 4. To the eccentric-strap F is attached an arm, H, the end of which, as the eccentric revolves, has imparted to it an elliptical movement, as shown by red line in Fig. 3, and at each revolution of the driving-shaft the end of this arm takes hold of one of the teeth of the spur-wheel I and turns it through the space of one tooth. The spur-wheel is double—that is, it consists of two toothed or ratchet-wheels, I I′, the latter one being furnished with a set of teeth which are in number one-half the number of the teeth or ratchets of the wheel I, as shown in red lines in Fig. 3. Said spur-wheels I and I′ may be pivoted to a standard attached to the bed-plate of the machine.

J is a stop attached to the under side of the plate A, as shown in Figs. 1, 2, 3, and 4. Said stop has a projection, *a*, catching into the teeth of the wheel I′.

K is a rod or bar extending across the machine and resting against the supports B B′, as shown in Fig. 4. To the bar K, near its ends, and to the lower side of the plate A, are attached two springs, L L, Figs. 3 and 4. These springs serve to move the plate A, so that the projection *a* on the stop J is always kept in contact with the wheel I′.

R is a stop-lever, which is attached or pivoted to the under side of the plate A in such a way that it may at will be moved forward against the end of the feed-bar *b*, and by pressing said feed-bar forward away from the cam which operates it the feed of the machine may be stopped at any time.

To the upper side of the plate A, beneath the presser M, is attached a small circular plate, N, provided with slots for the passage of the needle and feed.

O is a cloth-holder for holding the cloth in which the button-hole is to be made. The ends of this cloth-holder are semicircular, but the sides are straight and parallel, as represented in Fig. 1. Its central part is also cut away so as to form a slot with circular ends. Said slot is of such a size as to exactly fit the small circular plate N and allow the holder O to slide along the top of the plate A and to be turned around thereon, the circular plate N being all the time within the slot of the cloth-holder.

P is a guide attached to the top of the plate A, and at a distance from the circular plate N equal to the breadth of the side of said holder between the outer edge of the slot and the outer edge of said holder, so as to guide the holder as it slides along the plate A and is turned about the circular plate N by the action of the feed operating upon the cloth at one side of the axial line of said holder.

The upper side of the cloth-holder O is furnished with projecting pins to keep the cloth from changing its position upon said cloth-holder while the button-hole is being made, and also to insure its being turned with the cloth-holder, as above stated.

Button-holes of any size may be made on this holder O by beginning at the inner end of the button-hole, working around the outer end and back to the place of beginning, or a set of holders may be provided graduated in size to the size of the intended button-hole, which will in such case form a button-hole whose stitched ends will present the characteristics shown in Fig. 7

In forming a button-hole where a square end is needed, as shown in Fig. 6, in order to strengthen it it is necessary to stitch across the ends, technically known as "barring." To do this the extent of the backward and forward motion of the plate A must be doubled, so that the end or barring stitches may be twice as long as the other stitches. This is accomplished as follows: The stop-lever R is forced up against the end of the feed-bar so as to force the feed away from the cam which operates it, and thereby stop the feed. Then, by pulling upon the ring or handle of the stop J, I increase the throw of the plate A, the stop E preventing the plate from moving farther than the desired distance.

The button-holes made in this way are represented in Fig. 6. The barring-stitches may extend from the outer side of the row of stitches on one side of the button-hole to the outer side of the row of stitches on the other side of the same; or that distance may be divided into several stitches by pulling at the ring J so as to move the plate laterally, but only a portion of the distance it might be moved for one stitch, and for the next stitch another portion, until the stop E will not permit the plate A to be moved farther, the feed *b* being held at rest all the while in the manner shown.

Operation: As the eccentric draws the end of the eccentric-rod forward and raises it to operate the needle-arm it also throws forward and raises the arm H, as heretofore described, which motion causes said arm to take hold of one of the small teeth on the wheel I and revolve said wheel one notch. The revolution of the wheel I causes the wheel I′ to revolve in a corresponding manner, and the projection *a* on the stop J is caused to slide up the inclined side of one of the larger teeth of the wheel I′, and leaves said projection *a* resting upon the broad end of the tooth, instead of being in the notch between two teeth. This moves the plate A and the cloth forward, so that the next stitch will be taken within the slit for the button-hole instead of being taken through the cloth. The next revolution of the eccentric causes the arm H to revolve the wheel I one notch farther, and this affects the wheel I′ in a like manner, so that the projection *a* of the stop J slides down the face of the tooth I′ into the notch between that tooth and the next one, and the springs L cause the plate A and the cloth to be drawn back a distance equal to the depth of the notches between the teeth on the wheel I′. The stitch is now taken through the cloth, and so on continually until the end of the button-hole is reached, when, if it is to be square and barred across the end, the stop-lever R is pressed forward by the thumb, thus stopping the feed, while by inserting a finger in the ring or handle of the stop J and pulling the same toward the attendant, the throw of the plate is doubled, or, in effect, the feed is changed so as to stitch across the end of the button-hole at right angles to its axis. When one end is thus completed the cloth is reversed and the other side of the button-hole is completed in like manner, when, by holding the plate A in a fixed position during the time when the needle descends twice, a coil of the lower thread will be formed around the needle-thread, and upon drawing up the slack this will securely fasten the stitch. If, however, it be desired to make the button-hole as represented in Fig. 7, then the simple operation of making the stitches is continued from the beginning until the button-hole is completed, the holder O serving to turn the ends without supervision on the part of the attendant. It is evident that the ends of this latter button-hole may be barred, if desired, in the manner already described. It is also evident that one end may be square and barred while the other end is rounded, as in Fig. 7.

From the foregoing description it will be perceived that the lateral length of the stitch may be increased at pleasure while the machine is in operation, and without the removal or substitution of any of its parts, and that the position of the needle in relation to the surface of the material being stitched is the same in every stroke thereof.

Having described my invention, what I claim as new, and desire to secure by Letters Patent, is—

1. Stitching a bar across the end of a button-hole for the purpose of strengthening the same by means of devices which produce a lateral reciprocation of the material being stitched while it is also being fed forward, and permit the extent of the said lateral reciprocation to be increased at will by hand while the machine continues in operation.

2. Working and entirely completing a button-hole without the use of a hand-needle by means of devices substantially as herein described.

3. In combination with the arm H, the wheel I and the eccentric of the driving-shaft of a sewing-machine or its equivalents, for the purpose set forth.

4. In combination with the wheels I and I′, the arm H and the stop J, provided with the projection *a*, substantially as and for the purpose set forth.

5. In combination with the wheel I′, the stop J and the plate A, substantially as and for the purpose set forth.

6. In combination with the movable plate A of a sewing-machine, the cloth-holder O and the circular plate N, as and for the purpose set forth.

7. In combination with the cloth-holder O, the stationary guide P and circular plate N, substantially as and for the purpose set forth.

8. In combination with the springs L, the stop J, wheels I I′, arm H, and the eccentric of the driving-shaft of a sewing-machine, substantially as described, for the purpose of producing a zigzag stitch.

9. In combination with the feed-bar *b* and its eccentric regulating-lever, the lever R, for throwing the feed-bar entirely out of action, substantially as and for the purpose herein set forth.

BARTRAM & FANTON MANF. CO.,
By H. B. FANTON,
*President.*

Witnesses:
B. F. RYDER,
DAVID B. BOOTH.